Oct. 8, 1957 W. KAFKA 2,808,988
ELECTRICAL APPARATUS FOR FORMING PRODUCTS
OR QUOTIENTS OF PHYSICAL MAGNITUDES
Filed Sept. 20, 1954 2 Sheets-Sheet 1

United States Patent Office 2,808,988
Patented Oct. 8, 1957

2,808,988
ELECTRICAL APPARATUS FOR FORMING PRODUCTS OR QUOTIENTS OF PHYSICAL MAGNITUDES

Wilhelm Kafka, Tennenlohe-Turmberg, near Erlangen, Germany, assignor to Siemens-Schuckertwerke Aktiengesellschaft, Berlin-Siemensstadt and Erlangen, Germany, a German corporation Application September 20, 1954, Serial No. 457,001
Claims priority, application Germany September 21, 1953
24 Claims. (Cl. 235—61)

My invention relates to analogue computing or measuring apparatus and, in a more particular aspect, to electrical apparatus for forming a mathematical product or quotient of magnitudes represented by, or capable of being translated into, electric voltages or currents.

In such apparatus, as heretofore used for measuring, regulating or other engineering purposes such as those relating to the control and regulation of electric machines and to the protection of power distribution equipment, the formation of products or quotients of electric magnitudes has been effected with the aid of dynamometric measuring instruments and relays, or plural-grid electronic tubes. Such apparatus leave much to be desired in various respects. For instance, they are not sufficiently insensitive to jarring and do not satisfactorily meet the demand for devices capable of forming a product, quotient or reciprocal value without reliance upon movable or mechanically sensitive parts.

In these respects, it is an object of my invention to attain considerable improvements; and it is also an object to make electric apparatus of the above-mentioned computing type more versatile for various industrial applications as will appear from the following.

According to the invention, an apparatus for forming a factorial result—product or quotient—of two or more magnitudes is equipped with electric resistance bodies that are subjected to electric effects representative of the magnitudes; and at least one of these resistance bodies has magnetic field responsive conductance and is acted upon by a magnetic control field of a field strength dependent upon one of the magnitudes.

According to another feature of the invention, I prefer using as magnetically responsive resistance bodies those consisting of semiconductive compounds of the type $A_{III}B_V$, i. e. binary compounds of an element of the third group with an element of the fifth group of the periodic system of elements, such as indium antimonide (InSb), aluminum antimonide (AlSb), gallium antimonide (GaSb), indium arsenide (InAs), aluminum arsenide (AlAs), gallium arsenide (GaAs). These semiconductor compounds are distinguished by high carrier mobility, that is, the mobility of the electrons (excess electrons) and holes (defect electrons), this mobility being more than 6000 cm.$^2$/volt second and in some cases even more than 20,000 cm.$^2$/volt second. The carrier mobility of such compounds is much higher than that of other known magnetically-responsive resistor substances, such as bismuth; and the compounds also have a particularly large dependence of their ohmic resistance upon the strength of a magnetic field acting transverse to the flow of electric current through the semiconductor body. Especially suitable for the purposes of the invention are indium antimonide (InSb) and indium arsenide (InAs). As regards further information concerning $A_{III}B_V$ semiconductors, reference may be had to the copending application of H. Welker for Semiconductor Devices and Methods of Their Manufacture, Serial No. 275,785, filed March 10, 1952, and assigned to the assignee of the present invention.

According to another feature of the invention, the magnetically responsive resistance bodies in my computing devices consist of electronic semiconductors, preferably of the intrinsic type, which have a magnetic barrier layer formed by a zone relatively depleted of electron-hole pairs as compared with an adjacent zone of the same body. Relative to such magnetic-barrier layer semiconductors, reference may be had to the copending application of H. Welker for Controllable Electric Resistance Devices, Serial No. 297,788 filed July 8, 1952, now Patent No. 2,736,858, and also assigned to the assignee of the present invention.

Magnetic-barrier layer resistors control possibilities in addition to that afforded by the control of the magnetic field. Such additional control may be effected, for instance, by an electric field or by radiation. It is, therefore, possible to represent the denominator of a quotient by a controlling magnitude other than the magnetic control field or the electric current caused by that field. Besides, such an additional control of the resistance body may serve to eliminate the effect of any error magnitudes, or also for introducing another factorial magnitude to participate in the formation of the mathematical result to be computed.

The electric resistance of a magnetic-field responsive resistance body is expressed in good approximation by the equation $$R = a(1 + b \cdot H)$$

In this equation, $a$ and $b$ are definite values (coefficients) peculiar to the particular resistance body being used, and H is the magnetic field strength acting upon the resistance body. When producing the field strength, H, with the aid of windings traversed by an electric current $I_1$, the above mentioned equation may also be written as:

$$R = (a + c) \cdot I_1$$

In this equation, the coefficient "$a$" represents the ohmic resistance of the magnetically responsive resistor for zero value of the magnetic control field, and "$c$" is a proportionality factor, both coefficients being normally constant for any given temperature. The further explanations presented in a later place are predicated upon the latter equation.

The factorial results, namely products or quotients, to be formed according to the invention can be obtained in various ways and with different circuit connections involving further features of the invention. In this respect, reference is made in the following to the embodiments of the invention exemplified by the drawings in which.

Figure 1:
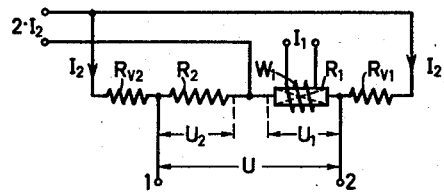
Fig. 1 shows schematically a basic circuit diagram for the formation of a product.

Functionally similar elements in the various illustrations are denoted by the same respective reference characters. For convenience and lucidity, the reference characters that denote resistors, such as $R_1$ and $R_2$ etc., are also used in the explanatory passages of this specification for denoting the resistance values of the respective resistors.

In the apparatus according to Fig. 1, the formation of a product is obtained as the difference between the voltage drops of two resistors $R_1$ and $R_2$. The resistors are traversed by respective currents of the same magnitude $I_2$. The resistor $R_1$ has magnetic-field responsive resistance characteristic and consists of one of the substances, for instance a binary compound of the type of $A_{III}B_V$, mentioned in the foregoing. The resistor $R_1$ is exposed to a magnetic control field schematically shown to be produced by a field winding $W_1$ under control by a current $I_1$ passing through the winding. The currents $I_1$ and $I_2$ represent the two factorial magnitudes of the product to be formed, and these currents may be analogues of any physical or mathematical magnitude. Two stabilizing resistors $R_{v1}$ and $R_{v2}$ are series connected with the respective resistors $R_1$ and $R_2$. The resistance values of the series resistors $R_{v1}$ and $R_{v2}$ are high in comparison with those of resistors $R_1$ and $R_2$ in order to enforce and maintain the same current magnitude in the two latter resistors. Depending upon the accuracy requirements of the apparatus, the series resistors $R_{v1}$, $R_{v2}$ are made about 10 to 100 or more times larger than the resistors $R_1$ and $R_2$. An output circuit has its terminals 1 and 2 connected across the two resistors $R_1$, $R_2$. The voltage U between the terminals 1 and 2 is equal to the difference between the voltage drops $U_1$ and $U_2$ of the resistors $R_1$ and $R_2$ respectively. This output voltage U is proportional to the product of the two currents $I_1$ and $I_2$. How the formation of the product comes about will be understood from the following equations:

$$U_1 = I_2 \cdot a + c \cdot I_2 \cdot I_1$$
$$U_2 = I_2 \cdot a + c \cdot I_2 \cdot O$$

The difference of voltages $U_1$ and $U_2$ is:

$$U_1 - U_2 = c \cdot I_1 \cdot I_2 = U$$

The resistors $R_2$ need not have a magnetically responsive resistance characteristic but may consist of any ohmic resistance material. Preferably, however, the resistors $R_1$ and $R_2$ are identical, that is, resistor $R_2$ is also magnetically responsive but is not subjected to a magnetic field. The equality of current magnitude in the two resistors $R_1$ and $R_2$ may be secured by means other than the provision of the series resistors $R_{v1}$ and $R_{v2}$, for instance with the aid of a current transformer with two windings of which one is closed by the current of the resistor $R_1$ and the other by the current of the resistor $R_2$.

It follows from the last-presented group of equations that in the circuit diagram of Fig. 1 any errors that may be caused by undesired changes in the coefficient "a," for instance due to changes in temperature, will cancel themselves from the result obtained. Further errors, as may be due to inaccuracy of the desired linear dependence between the conductance of the magnetically responsive resistance and the magnetic field strength acting thereupon, can be minimized by employing a circuit connection according to Fig. 2.

Figure 2:
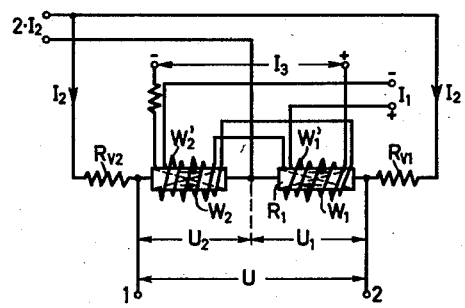
Fig. 2 is a more elaborate circuit diagram based upon the principle of Fig. 1.

In the apparatus of Fig. 2, two identical, magnetically responsive resistors $R_1$ and $R_2$ are connected with respective stabilizing resistors $R_{v1}$ and $R_{v2}$ in the same manner as in Fig. 1. However, each of the two resistors $R_1$ and $R_2$ is provided with a magnetic control field produced by a current $I_1$ flowing through field windings $W_1$ and $W_2$ respectively. In addition, each of the two resistors $R_1$ and $R_2$ is subjected to an auxiliary magnetic field produced by respective windings $W'_1$ and $W'_2$ in such a sense that the auxiliary field and the control field are cumulative relative to the resistor $R_2$ but differential relative to resistor $R_1$. The auxiliary field of windings $W'_1$ and $W'_2$ is produced by a current $I_3$. This current may be constant, or it may be variable together with current $I_2$ or $I_1$. The current $I_3$ may also be variable in accordance with the product of the currents $I_1$ and $I_2$, that is, in accordance with the voltage U. The latter case, if the currents $I_1$ and $I_2$ are alternating, affords introducing a phase angle between $I_1$ and $I_2$ into the product voltage U formed by the apparatus. This can be done in satisfactory approximation when the apparatus, used as a relay or regulating device, operates in the vicinity of its critical voltage or current value to which the apparatus is supposed to respond.

Figure 3:
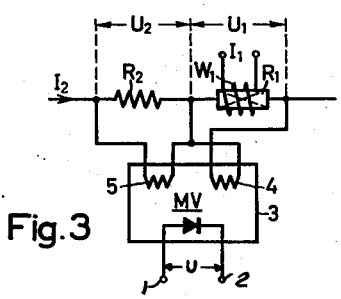
Fig. 3 shows the circuit diagram of another apparatus for the formation of a product.

The formation of a product with the aid of a difference voltage taken from two resistors can also be effected in accordance with the principle embodied in the circuit diagram of Fig. 3. In this apparatus, the two voltage drops $U_1$ and $U_2$ of the two resistors $R_1$ and $R_2$ respectively are applied as input excitation to separate control windings 4 and 5 of a magnetic amplifier 3. The two factors that determine the product to be formed are again represented by the respective currents $I_1$ and $I_2$. The current $I_1$ acts upon the resistor $R_1$ through the magnetic field of a winding $W_1$, and the current $I_2$ flows serially through the resistors $R_1$ and $R_2$. The product voltage U appears across the output terminals 1 and 2 of the magnetic amplifier. This application of a magnetic amplifier permits using a simple series connection of the two resistors $R_1$ and $R_2$ so that the auxiliary resistors $R_{v1}$ and $R_{v2}$ shown in Figs. 1 and 2 can be eliminated.

A quotient of two magnitudes can be formed only in approximation within a given range. This is because, if the denominator of a quotient were zero, the value of the quotient would be infinite, a condition impossible to represent by technical means.

Figure 4:
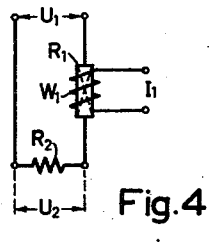
Fig. 4 is a simple circuit diagram for the formation of a quotient.

Fig. 4 shows a basic circuit diagram for quotient formation which is distinguished by utmost simplicity but is limited to applications of moderate accuracy requirements. The desired quotient $$Q = \frac{U_1}{I_1}$$

is formed as a voltage drop $U_2$ in an auxiliary resistor $R_2$ which is traversed by current $I_2$ and is connected to a voltage $U_1$ in series with a magnetically responsive resistor $R_1$. The magnetically responsive resistor $R_1$ is exposed to a magnetic control field produced by a field winding $W_1$ traversed by a current $I_1$. The voltage $U_1$ in this embodiment represents the numerator and the current $I_1$ the denominator.

Let $R_i$ be the internal resistance of the current source supplying the voltage $U_2$, then the current $I_2$ in resistor $R_2$ is:

$$I_2 = \frac{U_1}{a + R_2 + R_i + c \cdot I_1}$$

When $a + R_2 + R_i$ is small relative to $c \cdot I_1$, then $I_2$ is approximately equal to $$\frac{U_1}{c \cdot I_1}$$

since $U_2 = I_2 \cdot R_2$ and hence $U_2$ is proportional to $I_2$, $U_2$ is also proportional to $$\frac{U_1}{CI_1}$$

consequently, $U_2$ is proportional to the desired quotient $$Q = \frac{U_1}{I_1}$$

Figure 5:
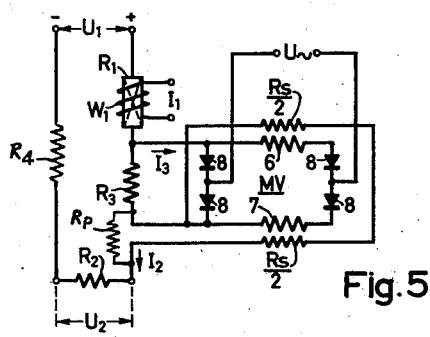
Fig. 5 is a more elaborate circuit diagram for quotient formation based upon the principle of Fig. 4.

The apparatus for quotient formation shown in Fig. 5 affords more accurate results. The numerator of the quotient to be formed is again present, for instance, as a voltage $U_1$ and the denominator as a current $I_1$. Disregarding at first the added resistors $R_4$ and $R_p$, the voltage $U_1$ is impressed upon the series connection of a magnetically responsive resistor $R_1$, an auxiliary resistor $R_2$, and a load resistor $R_3$. The magnetically responsive resistor $R_1$ is subjected to the magnetic field produced by the current $I_1$ flowing through a field winding $W_1$. The resistor $R_2$ serves to supply a voltage drop $U_2$ proportional to the desired quotient and, therefore, is hereinafter called the "quotient resistor."

The illustrated magnetic amplifier comprises a bridge network of two saturable reactors 6, 7 and four rectifier units 8. The power-supply diagonal of the bridge is energized from a source of alternating voltage $U\sim$. The output circuit of the bridge includes the above-mentioned load resistor $R_3$ and supplies it with rectified current under control of two premagnetizing coils $$\frac{R_s}{2}$$

mounted on the cores of the respective reactors 6, 7. The amplifier control coils $$\frac{R_s}{2}$$

have equal resistance thus forming together the total resistance $R_s$. The two control coils are connected in the amplifier input circuit, and this circuit (still disregarding the additionally illustrated resistor $R_p$) lies in series with the above-mentioned resistors $R_1$, $R_2$ and $R_3$. The voltage of the load resistor $R_3$ is denoted by $U_3$. The amplifier output circuit is so poled relative to resistor $R_3$ that the amplifier output current in resistor $R_3$ flows in a direction opposed to that of the current caused by the voltage $U_1$ and hence also opposed to the current $I_2$ that corresponds to the quotient and flows through the resistor $R_2$. The product of load resistance $R_3$ times amplifier output current $I_3$ is chosen equal to the product of the current $I_2$ times the total resistance of the series connected resistors $R_1$, $R_3$, $R_s$ and $R_2$. The magnetic amplifier is energized, for instance, from a separate source of constant alternating voltage. Instead, the energizing voltage $U\sim$ may also be dependent upon $U_1$, $U_2$ or $I_1$, or may consist of an alternating voltage that varies, in a compensating sense, in response to changes in temperature. Again denoting by $R_i$ the interior resistance of the source of voltage $U_1$, and still disregarding the two added resistors $R_4$ and $R_p$, the product of $R_3$ and $I_3$ is determined by:

$$R_3 \cdot I_3 = (a + R_2 + R_s + R_3 + R_i) \cdot I_2$$

It follows that:

$$I_2 = \frac{U_1}{c \cdot I_1}$$

Consequently, the current $I_2$ is proportional to the quotient to be determined. The proportionality exists as long as the magnetic amplifier is capable of passing through the resistor $R_3$ a current $I_3$ according to the equation $$I_3 = \frac{I_2(a + R_2 + R_s + R_3 + R_i)}{R_3}$$

In apparatus according to Fig. 5, the accuracy of quotient formation can be further improved to a considerable extent by maintaining a constant value of the ratio of the quotient resistance $R_2$ to the coefficient $c$ of the resistance variation in the magnetically responsive resistor $R_1$, the resistance of $R_1$ being expressed by the equation $R_1 = a + c \cdot I_1$ wherein "$a$," as mentioned above, is the ohmic resistance of the magnetically responsive resistor without the magnetic field. Furthermore, the ratio $$A = \frac{U_3}{I_2}$$

which represents the relation between the current $I_2$ in the quotient resistor $R_2$ and the voltage $U_3$ of resistor $R_3$ and hence has the dimension of resistance, is made equal to the sum $B$ of the ohmic values of all resistors in the circuit of the quotient resistor $R_2$ for the condition $I_1 = 0$, i. e. for zero magnet field at the magnetically responsive resistor $R_1$.

There are different ways, described below, for satisfying the just mentioned conditions $A = B$ and $$\frac{R_2}{c} = \text{constant}$$

even if B and $c$ are not constant. When employing a voltage controlling amplifier, for instance a magnetic amplifier in self-saturating connection as illustrated in Fig. 5, a resistor $R_p$ is additionally connected in parallel relation to the input circuit of the amplifier. However, when employing a current controlled amplifier for the purpose of quotient formation, the circuit arrangement according to Fig. 6 may be used, showing, by way of example, a magnetic amplifier MV in series connection. The significance of the details in Fig. 6 is apparent from the reference characters identical with those used in Fig. 5.

Figure 6:
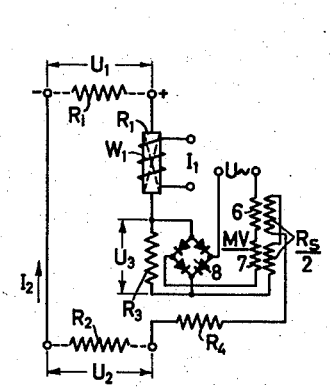
Figs. 6 and 7 illustrate two further examples of circuit diagrams also applicable for the formation of quotients.

According to another feature of the invention, the apparatus of Figs. 5 and 6 are further provided with a resistor $R_4$. This resistor is given a particular dimensioning and serves for obviating any error influences, for instance due to changes in temperature, upon the individual resistance components of the circuit arrangement so as to attain the conditions $A = B$ and $$\frac{R_2}{c} = \text{constant}$$

Considering the added resistance body $R_4$, the value of total resistance in the quotient resistor circuit now is $B = a + R_3 + R_s + R_2 + R_4 + R_i$. The resistor $R_4$ may serve for compensating the entire temperature dependence of all other resistors series connected with resistor $R_4$. In that case, the resistor $R_4$ is given such a temperature characteristic that it modifies in the desired manner the temperature dependence of the sum of the other resistors. However, the resistor $R_4$ may also serve for compensating other error magnitudes. For instance, resistor $R_4$ may be made of a semiconductor substance of the type $A_{III}B_V$ as described in the foregoing, and its resistance may be varied by a magnetic field controlled by the error magnitude to be compensated.

For further explanation of the just-mentioned features of the invention, the following mathematical relations are presented with reference to the embodiment according to Fig. 5. Assume that the individual resistors are additionally dependent upon an error magnitude $t$, for instance in response to changes in temperature. Then, the following applies to the individual resistors in the circuit of the quotient resistor:

$$R_1 = a + cI_1 = a_0(1 + \alpha_1 t) + c_0(1 + \gamma t)I_1$$
$$R_i = R_{i0}(1 + \alpha_i t), R_s = R_{s0}(1 + \alpha_s t)$$
$$R_3 = R_{30}(1 + \alpha_3 t)$$
$$R_4 = R_{40}(1 + \alpha_4 t)$$
$$R_2 = R_{20}(1 + \alpha_2 t)$$

The values A and B are likewise modified by the error magnitude $t$ as follows:

$$A = A_0(1 + \alpha_A t)$$

$$B = a + R_i + R_2 + R_3 + R_4 + R_s = B_0(1 + \beta t)$$

The factors 1, 2, etc., also $\beta$ and $\gamma$ denote the various error values.

According to the feature of the invention last discussed, it is required that $A = B$. It follows therefrom that $A_0 = B_0$, and $\alpha_A = \beta$. Since $$\frac{R_2}{c}$$

is supposed to be constant, $\alpha_2$ is chosen equal to $\gamma$. In consideration of the fact that $\alpha_A = \beta$, the values of $R_{40}$ and $\alpha_4$ are to be chosen accordingly so that this requirement is satisfied. Besides, care must be taken to have all resistors assume the same temperature. Under these conditions:

$$I_2 = \frac{\sum U}{\sum R} = \frac{U_1 + U_3}{\sum R} = \frac{U_1 + A \cdot I_2}{B + c \cdot I_1}$$

It follows that:

$$B \cdot I_2 + c \cdot I_1 \cdot I_2 = U_1 + A \cdot I_2$$

If now A is chosen equal to B, then $$c \cdot I_2 = \frac{U_1}{I_1}$$

It follows further that $I_2 \cdot R_2 = U_2$.
Consequently, the current $I_2$ is $$\frac{1}{c}$$

times the quotient Q being sought. Now, the voltage $U_2$ of the quotient resistor $R_2$ is supposed to be proportional to $K \cdot Q$; that is, equal to $$K \cdot \frac{U_1}{I_1}$$

wherein K denotes a constant proportionality factor. Furthermore, $I_2 \cdot R_2$ is supposed to be equal to $K \cdot C \cdot I_2$. This is the case when $$K = \frac{R_2}{c} = \text{constant}$$

Then the voltage $U_2$ of the quotient resistor $R_2$ is proportional to the quotient $$Q = \frac{U_1}{I_1}$$

There are several possibilities of satisfying the requirement $$A = \frac{U_3}{I_2}$$

or $U_3 = A \cdot I_2$, wherein $A = A_0(1 = \alpha_A t)$.

One of these possibilities is based upon the requirement that $U_3 = A \cdot I_2 = (I_3 - I_2)R_3$. If $I_3$ is large relative to $I_2$, then the value of $I_3$ is approximately equal to $K_1 \cdot I_2$, wherein $K_1$ denotes a constant value. The value $\alpha_A$ of the proportionality factor A is chosen equal to the error coefficient $\alpha_3$ of the resistor $R_3$. The approximate equality between $I_3$ and $K_1 \cdot I_2$ can be realized by means of a current amplifier, for instance a magnetic amplifier, in current-transformer connection; that is, a magnetic amplifier without feed-back coupling and without self saturation as exemplified by the circuit diagram according to Fig. 6. The current $I_3$ is not dependent upon resistance changes of resistor $R_3$ or of the supply voltage of the magnetic amplifier but is equal to $K_1 \cdot I_2$.

According to another possibility, the requirement is made that $U_3 = A \cdot I_2 = K_2 \cdot I'_2$. In this equation, $K_2$ denotes a constant and $I'_2$ denotes such a substitute current for $I_2$ that the equation is satisfied. In this case, a voltage controlling amplifier, for instance a magnetic amplifier in self saturation connection, is used as shown for example in Fig. 5, together with the additional resistor $R_P$ in parallel relation to the control coils 6, 7 of the amplifier. The total resistance of $R_s$ and $R_P$ is $$R_s' = \frac{R_s \cdot R_p}{R_s + R_p}$$

It follows that:

$$I_2' = I_2 \frac{R_p}{R_s + R_p} = K_3 \cdot I_2(1 + \alpha_A t)$$

provided $R_P$ and/or $R_s'$ are dependent upon the error magnitude. This dependency also permits controlling the error coefficient $\alpha_A$.

Aside from magnetic amplifiers, other amplifying devices may be used such as semiconductor amplifiers, for instance, those based upon germanium (transistors), also amplifiers on the basis of semiconductor compounds of the type $A_{III}B_V$ as described in the foregoing, or semiconductor amplifiers with magnetic barrier layers also as mentioned above. The diagram of a circuit equipped with a transistor amplifier is schematically illustrated in Fig. 7.

Figure 7:
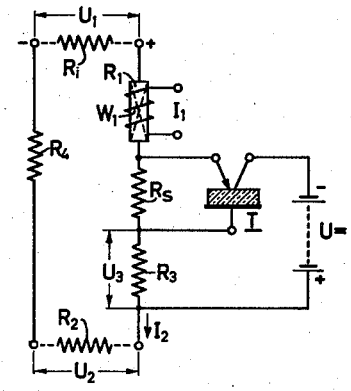

Except for the amplifier, the apparatus of Fig. 7 is basically similar to that of Fig. 5. The transistor is denoted by T. The resistance body $R_s$ corresponds to the two control windings $$\frac{R_s}{2}$$

shown in Fig. 5; and the voltage source U= in Fig. 7 corresponds to the voltage source U~ of Fig. 5. The resistance $R_s$ in the transistor input circuit is preferably kept low so that input resistance of the transistor amplifier has no appreciable effect upon the desired operation.

According to a further feature of the invention, the quotient forming operation can be improved by providing the amplifier with a counter or feed-back coupling derived from its output voltage, such feed-back couplings in amplifiers being well known as such. With an amplifier energized by alternating current which, upon rectification, energizes the load resistor $R_3$, it is preferable to provide smoothing and filtering means, for instance capacitors and inductance coils, between the amplifier output side and the load resistor $R_1$. Smoothing and filtering means, besides, are also preferably employed when the current or voltage magnitudes indicative of the numerator or the denominator are not originally available as direct-current magnitudes but as rectified alternating-current magnitudes.

If the magnetically responsive resistor $R_1$, used in apparatus according to the invention, has a magnetic field versus resistance characteristic whose initial range is non-linear, then, according to one of the above-mentioned features of the invention, a constant auxiliary magnetic field may be superimposed upon the control field produced by the current $I_1$ in the winding $W_1$; and the constant auxiliary field is given such a magnitude that it eliminates the non-linearity obtaining in the initial range of the characteristic. The auxiliary magnet field may be produced electromagnetically or by permanent magnet means. If permanent magnets of ferrites or other electrically non-conducting materials are used, the magnet bodies may directly touch the magnetically responsive resistance bodies. Two examples of magnetic field devices for quotient formation, including an auxiliary field produced by a permanent magnet as just mentioned, are illustrated in Figs. 8 and 9.

Figure 8:
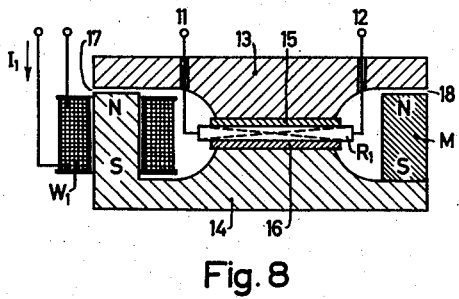
Figs. 8 and 9 show cross sections of respective examples of magnetic-field devices suitable for the purposes of the invention, for instance in circuit diagrams according to the preceding illustrations.

According to Fig. 8, the magnetic control field produced by the current $I_1$ flowing through the field winding $W_1$ acts upon the magnetically responsive resistor $R_1$ in parallel relation to an auxiliary field produced by a permanent magnet M. The current-supply leads 11 and 12 for the resistor $R_1$ pass through openings in a pole shoe 13. This pole shoe, as well as the lower pole shoe 14 of the magnet system in this embodiment, consists of electrically conductive material. To prevent short-circuiting the resistor $R_1$ by these pole shoes, they are separated from the resistor by electrically non-conducting layers 15 and 16. These layers consist preferably of ferrite or the like, so that they do not produce additional air gaps. For preventing disturbing mutual effects of the electric magnetic control field produced by the current $I_1$ in winding $W_1$ on the one hand, and the auxiliary field of the permanent magnet 11 on the other hand, the magnetic system is provided with two air gaps 17 and 18.

Figure 9:
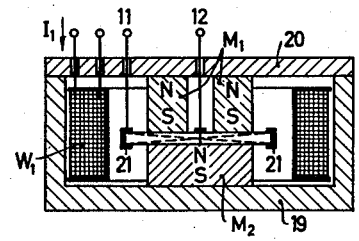

In the device according to Fig. 9, the magnetic control field produced by the current $I_1$ through winding $W_1$ acts upon the magnetically responsive resistance body $R_1$ in series relation to an auxiliary magnetic field produced by two permanent magnets $M_1$ and $M_2$. The permanent magnets consist of ferrite so that electrically insulating intermediate layers are not required. Air gaps in the magnetic circuit are likewise not required in this device. The connections 11, 12 for the current supply of the resistor $R_1$, in contrast to Fig. 8, are connected in a different manner with the resistor $R_1$. The resistor has the shape of a circular disk. On of the supply leads is connected to a centrally located terminal while the other lead is connected to an endless marginal layer 21 peripherally surrounding the resistor body. The entire magnetic system is enclosed in a cup-shaped housing 19 covered by a lid 20, both parts consisting of magnetizable material.

Magnetic resistance devices according to Figs. 8 and 9 may be used in any of the circuits described with reference to the preceding illustrations.

The circuit arrangement according to Figs. 5 to 7, including the devices according to Figs. 8 and 9, are suitable for use as quotient relays and quotient time relays operating without movable contacts, the relay action being obtained by virtue of the connection of the product or quotient forming circuit with a magnetic amplifier or a relaying transistor which as such is a switching or relaying component with a feed-back characteristic; or the relay action is obtained by connecting the computing portion of the system with any other controllable and feed-back coupled resistance arrangement. Resistance arrangements with feed-back connected and magnetically controlled resistors afford in such cases an especially advantageous and simple construction which, like magnetic amplifier relays, may also produce a desired time delay in dependence upon the magnitude of the quotient. An example of such an application is the impedance-time relay operating without movable contacts. The time delay in such a relay can be obtained by virtue of the inherent inertia of the amplifier or also by additional means.

The above-described circuit connections are presented as examples which may be modified in various ways and which may be combined for instance with accessory means, such as explained with reference to Fig. 2, for the correction of various error effects such as errors due to changes in temperature. The magnetically responsive resistors and their magnetic control fields can be adapted to the requirements of each particular application. For instance, when the apparatus is to be used for rapid regulation, then care should be taken of securing a rapid build-ing-up of the magnetic control field in order to avoid the occurrence of detrimentally long time constants. Relative to the use of magnetically responsive resistors of the above-mentioned substances, it may be added that the illustration of the magnetic devices in Figs. 1 through 7 is intended to be schematic. In reality, the magnetic fields have the most favorable effect if their direction is not coincident with that of the current flow in the resistor but extends transverse, preferably perpendicularly, to the current flow as is the case in the devices shown in Figs. 8 and 9.

It is generally preferable to keep the power consumption of the product or quotient forming apparatus very small and to amplify this slight power output. An amplifier of the magnetic type is particularly suitable for this purpose. It is especially advantageous to combine the computing portion of the system with a magnetic amplifier in self-saturating connection and with an additional feed-back coupling for the purpose of obtaining a relay without movable contacts applicable for most diversified purposes, for instance, for selective protection of power distribution systems or other electrical apparatus and machinery in response to active, reactive and other components of electric magnitudes. Such relays may also readily be provided with a desired time-delay characteristic with the aid of such conventional time-delay means as the inductance-coil or capacitor circuits used with magnetic amplifiers. As examples of complex measuring results that may be formed by systems according to the invention, the following may be mentioned: the power $N=U.I$ of a direct current, the power $U.I \cos \varphi$ in an alternating-current circuit, the impedance $$Z = \frac{U}{I}$$

The power factor $\cos \varphi$ can be formed from the relation $$\frac{U \cdot I \cdot \cos \varphi}{U \cdot I}$$

For this purpose, the product $U.I \cos \varphi$ is first formed as an alternating current or voltage which is then rectified. Then a product $U.I$ is formed of the rectified current value times the voltage value, and subsequently a third apparatus is applied to form the quotient of these two products.

Most diversified problems can also be solved for engineering purposes relating to regulation and control of electric drives. For instance, the diameter of a take-up reel or drum may be represented by the quotient of two speeds of revolution, namely the revolving speed of a reel or drum of constant diameter proportional to the linear traveling speed of the web or band being wound up, and the revolving speed of the take-up reel receiving the band. Such an apparatus, in conjunction with regulating means controlled thereby, may be used for regulating the wind-up drive for constant pulling tension in the band being wound up. The speeds of revolution can simply be translated into electric voltages and currents by use of conventional tachometer dynamos.

It will be obvious to those skilled in the art, upon a study of this disclosure, that apparatus according to my invention are amenable to modifications and applications other than those specifically mentioned and hence may be embodied by circuit connections and constructions other than those particularly illustrated and described.

I claim:

1. Apparatus for forming a product of two factorial magnitudes comprising two resistors, a current-supply circuit connected with said two resistors and having an input voltage proportional to one of said magnitudes and having means for maintaining in said respective resistors equal amounts of currents due to said voltage, a magnetic device having a magnetic field and having field control means for varying said field in accordance with said other magnitude, at least one of said resistors having magnetic-field responsive conductance and being disposed in said field, and output means connected with said two resistors and responsive to the difference of said voltage drops for providing a resultant voltage proportional to said product.

2. In apparatus according to claim 1, said current-equalizing means in said current-supply circuit comprising a current transformer having two windings connected with said two resistors and traversed by the respective current of said respective resistors.

3. Apparatus for forming a product of two factorial magnitudes, comprising two main resistors, current-supply means having a voltage proportional to one of said magnitudes, two auxiliary resistors of large ohmic resistance as compared with said main resistors, one of said main resistors and one of said auxiliary resistors being connected in series with each other and in parallel to said other main resistor and auxiliary resistor across said supply means so that said two main resistors are traversed by equal currents due to said voltage, said two main resistors being interconnected in series-opposed voltage relation to each other, a magnetic device having a magnetic field and having field control means for varying said field in accordance with said other magnitude, at least one of said main resistors having magnetic-field responsive conductance and being disposed in said field, and output means connected across said two main resistors to provide a resultant output voltage proportional to said product.

4. Apparatus for forming a product value of two factorial magnitudes, comprising two series-connected resistors of which at least one has magnetic-field responsive conductance, circuit means connected with said resistors for passing therethrough equal currents proportional to one of said two magnitudes, a magnetic device having a magnetic field in which said one resistor is disposed, said device having a field excitation circuit for varying said field and thereby the conductance of said one resistor in proportion to said other magnitude, a magnetic amplifier having two differentially interrelated premagnetizing control coils connected with said respective resistors, and said amplifier having an output circuit to provide a voltage proportional to the product to be determined.

5. Apparatus for forming a product value of two factorial magnitudes, comprising two substantially identical resistors of magnetic-field responsive conductance, circuit means connected with said resistors for passing therethrough equal currents proportional to one of said two magnitudes, two magnet devices each having a main magnetic field and a superimposed auxiliary magnetic field and having main excitation means and auxiliary excitation means for producing said respective fields, each of said two resistors being disposed in said superimposed fields of one of said respective devices so as to have its conductance jointly controlled by said main and auxiliary fields of said device, circuit means connected to said two main excitation means for controlling said respective main fields in proportion to said other magnitude, said auxiliary fields having equal field strengths in said two resistors and being additive to said main field in one resistor and subtractive in said other resistor, and output-circuit means connected with said two resistors and responsive to the voltage drops caused in said resistors by said current whereby said output-circuit means provide a voltage indicative of the product magnitude to be formed.

6. In apparatus according to claim 5, said auxiliary fields being constant.

7. In apparatus according to claim 5, said two auxiliary excitation means of said respective magnet devices being connected with said circuit means for varying said auxiliary fields in proportion to the current flowing through said two resistors.

8. In apparatus according to claim 5, said two auxiliary excitation means of said respective magnet devices being connected with said main excitation means for varying said auxiliary fields in proportion to the current producing said main fields.

9. In apparatus according to claim 5, said two auxiliary excitation means of said respective magnet devices being connected with said output-circuit means for exciting said auxiliary fields in dependence upon said product.

10. Apparatus for forming a quotient of two magnitudes, comprising a first resistor of magnetically responsive conductance, a second resistor, a current-supply circuit comprising said two resistors in series connection with each other and having a voltage proportional to the denominator magnitude, a magnet device having a magnetic control field proportional to the numerator magnitude, said first resistor being disposed in said field to vary its conductance with said numerator magnitude whereby the current of said supply means produces in said second resistor a voltage drop proportional to the quotient to be determined, and a pair of output terminals connected across said second resistor.

11. Apparatus according to claim 10, comprising a magnetic amplifier having a direct-current output circuit and a load resistor in said output circuit and having premagnetizing control coils, said load resistor and said control coils of said amplifier being connected in said current-supply circuit in series relation to said first and second resistors, said amplifier output circuit being poled to have the amplifier-output current in said load resistor opposed to the current caused by said denominator-proportional voltage, and the product of the resistance of said load resistor times said amplifier-output current being substantially equal to the product of the current times the total resistance of the resistors series connected in said current-supply circuit.

12. In apparatus according to claim 11, said second resistor having a resistance whose ratio to the coefficient of the magnetically responsive resistance characteristic of said first resistor is constant; and the ratio of the current in said second resistor to the amplifier output voltage being equal to the sum of all resistances in the circuit of said second resistor for the zero value of said magnetic field in said first resistor.

13. In apparatus according to claim 12, said magnetic amplifier being of the current controlling type, and said load resistor in said amplifier-output circuit having an error coefficient equal to the error coefficient of said ratio.

14. In apparatus according to claim 12, said magnetic amplifier being of the voltage controlling type, and having another resistor connected parallel to said amplifier input circuit.

15. Apparatus according to claim 11, comprising an additional resistor series connected in said current-supply circuit and having a condition-responsive resistance for compensating the condition-responsive error of the sum of all resistances of said current supply circuit, whereby said sum is condition-independently maintained equal to the ratio of the current in said second resistor to the amplifier output voltage for the zero value of said magnetic field.

16. Apparatus according to claim 10, comprising a magnetic amplifier having an alternating-current supply of constant voltage and a direct-current output circuit, said amplifier having saturable reactors and a full-wave connection of rectifiers connected between said power supply and said output circuit, and amplifier input circuit having premagnetizing control coils on said reactors, and a load resistor in said output circuit to be traversed by direct current controlled by said control coils, said load resistor and said control coils being connected in said current-supply circuit in series relation to said first and second resistors, said amplifier output circuit being poled to have the amplifier-output current in said load resistor opposed to the current caused by said denominator-proportional voltage, and the product of the resistance of said load resistor times said amplifier-output current being substantially equal to the product of the current times the total resistance of the resistors series connected in said current-supply circuit.

17. Apparatus according to claim 10, comprising a semiconductor amplifier having an input circuit and an output circuit, an input resistor and a load resistor connected in series with said first resistor and said second resistor in said current-supply circuit, said input circuit being connected across said input resistor to be excited by the voltage drop of said input resistor, and said output circuit being connected across said load resistor in voltage-opposed polarity relation to said current-supply circuit.

18. Apparatus according to claim 10, comprising an amplifier having an input circuit and an output circuit, an input resistor and a load resistor connected in series with said first resistor and said second resistor in said current-supply circuit, said input circuit being connected across said input resistor to be excited by the voltage drop of said input resistor, said output circuit being connected across said load resistor in voltage-opposed polarity relation to said current-supply circuit, and said amplifier having a counter-acting feed-back coupling between said output and input circuits.

19. Apparatus according to claim 10, comprising an amplifier having an input circuit and an output circuit, an input resistor and a load resistor connected in series with said first resistor and said second resistor in said current-supply circuit, said input circuit being connected across said input resistor to be excited by the voltage drop of said input resistor, said output circuit being connected across said load resistor in voltage-opposed polarity relation to said current-supply circuit, and said amplifier having in said output circuit a current considerably larger than the maximum current in said second resistor.

20. In apparatus according to claim 10, said first resistor having a magnetically responsive resistance characteristic whose initial portion is non-linear, and said magnet device comprising a controllable magnet for producing said control field and an auxiliary magnet means of constant field strength for superimposing upon said control field a constant auxiliary field for compensating the non-linearity in said initial portion of said resistance characteristic.

21. In apparatus according to claim 20, said controllable magnet consisting of an electromagnet and having a field structure, and said auxiliary magnet consisting of a permanent magnet joined with said field structure.

22. In apparatus according to claim 21, said permanent magnet consisting of electrically non-conducting material and being disposed in contact with said first resistor.

23. In apparatus according to claim 21, said permanent magnet being magnetically parallel connected with said electromagnet relative to the resultant magnetic field effective upon said first resistor.

24. In apparatus according to claim 20, said controllable magnet consisting of an electromagnet and having a field structure, said field structure having two pole shoes spaced from each other, said first resistor being disposed between said two pole shoes, and said permanent magnet comprising two bodies disposed between said first resistor and said respective pole shoes.

References Cited in the file of this patent

UNITED STATES PATENTS

| | | |
|---|---|---|
| 2,464,807 | Hansen | Mar. 22, 1949 |
| 2,551,265 | Hansen | May 1, 1951 |
| 2,587,193 | Miller | Feb. 26, 1952 |
| 2,616,074 | McCreary | Oct. 28, 1952 |
| 2,754,456 | Madelung | July 10, 1956 |

OTHER REFERENCES

Zeitschrift für Naturforschung (Welker) 1952, pages 744–749.